(12) United States Patent
Enderwitz et al.

(10) Patent No.: US 12,552,706 B2
(45) Date of Patent: Feb. 17, 2026

(54) APPARATUS AND METHOD FOR FORMING A MEMBRANE

(71) Applicant: Endress+Hauser Conducta GmbH+Co. KG, Gerlingen (DE)

(72) Inventors: Carsten Enderwitz, Dresden (DE); Steffen Heinitz, Lommatzsch (DE); Roland Zilly, Jahnsdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 18/514,073

(22) Filed: Nov. 20, 2023

(65) Prior Publication Data

US 2024/0166554 A1  May 23, 2024

(30) Foreign Application Priority Data

Nov. 18, 2022 (DE) ...................... 10 2022 130 625.9

(51) Int. Cl.
*C03C 17/02* (2006.01)
*G01N 27/36* (2006.01)

(52) U.S. Cl.
CPC ............. *C03C 17/02* (2013.01); *G01N 27/36* (2013.01); *C03C 2218/13* (2013.01)

(58) Field of Classification Search
CPC .... G01N 27/36; C03C 17/02; C03C 2218/13; C03B 7/005; C03B 7/22
See application file for complete search history.

(56) References Cited

U.S. PATENT DOCUMENTS

| 2003/0056539 A1* | 3/2003 | Auras ...................... C03B 7/22 |
| | | 65/300 |
| 2004/0154335 A1* | 8/2004 | Hayoz ...................... C03B 7/22 |
| | | 65/125 |

(Continued)

FOREIGN PATENT DOCUMENTS

| DE | 10116075 C1 | 5/2002 |
| DE | 102015114334 A1 | 6/2016 |

(Continued)

OTHER PUBLICATIONS

Brennraum/Glasschmelze, https://www.irpod.net, (last accessed Jun. 6, 2023), 4 pp. (English Translation Provided).

*Primary Examiner* — Erin Snelting
(74) *Attorney, Agent, or Firm* — Kelly J. Smith; Endress+Hauser (USA) Holding, Inc.

(57) ABSTRACT

A system and method for forming a membrane on an immersion tube for an electrochemical sensor comprise a step of providing a first immersion tube having a first opening and a second opening, and an apparatus having a melting system, a positioning system, an imaging apparatus, a pressure supplier, a control system. The melting system includes a heating means and a crucible containing a melt. The positioning system is suitable to move the first immersion tube relative to the crucible, such that the first opening of the first immersion tube is immersed in the melt. The imaging apparatus includes a camera, which is temperature sensitive and is arranged such that it can see the melt. The pressure supplier is connected air tightly with the first opening of the first immersion tube. The control system is connected with the melting system, the positioning system, the imaging apparatus and the pressure supplier.

5 Claims, 2 Drawing Sheets

(56) References Cited

U.S. PATENT DOCUMENTS

| | | | |
|---|---|---|---|
| 2016/0137541 A1* | 5/2016 | Zilly | C03B 7/005 65/161 |
| 2016/0176745 A1* | 6/2016 | Zilly | C03B 9/41 700/157 |
| 2019/0178833 A1* | 6/2019 | Enderwitz | C03B 19/01 |
| 2021/0140915 A1* | 5/2021 | Wilhelm | C03B 9/00 |

FOREIGN PATENT DOCUMENTS

| | | | |
|---|---|---|---|
| DE | 102019130479 A1 | 5/2021 | |
| EP | 1447388 A1 | 8/2004 | |

* cited by examiner

APPARATUS AND METHOD FOR FORMING A MEMBRANE

CROSS-REFERENCE TO RELATED APPLICATION

The present application is related to and claims the priority benefit of German Patent Application No. 10 2022 130 510.4, filed on Nov. 17, 2022, the entire contents of which are incorporated herein by reference.

TECHNICAL FIELD

The present disclosure relates to an apparatus and to a method for forming a membrane.

BACKGROUND

Electrochemical, for example, potentiometric, sensors can comprise an ion-selective membrane, on which in operation a potential dependent on the concentration of a certain kind of ion forms. The best known example of such a sensor is a potentiometric single-rod measuring chain having a pH-glass electrode. This includes a membrane of a pH-selective glass, which is usually blown on the end of a tubular shaft of glass, wherein the membrane seals an end of the shaft. Accommodated within the shaft is a liquid or thickened, gel-type inner electrolyte contacting the membrane. The inner electrolyte comprises, as a rule, a buffer system, by means of which the electrolyte is set to a predetermined pH value. For measuring, the glass membrane is brought in contact with a measured liquid, such that at the interface with the measured liquid a gel layer forms, which can absorb or give off hydronium ions (H+, or H3 O+). In such case, there occurs at the interface between the membrane glass and the measured liquid a dissociation, in the case of which alkali ions of the membrane glass are replaced by H+ ions from the measured liquid, such that a plurality of hydroxyl groups are formed in the gel layer. Depending on pH value of the measured liquid, H+ ions diffuse out of the gel layer or into the gel layer. In measurement operation of the glass electrode, this occurs both on the membrane surface contacting the measured liquid as well as also on the opposite membrane surface contacting the inner electrolyte. Since the inner electrolyte has a constant pH value, there results across the membrane a potential difference dependent on the pH value of the measured medium.

Depending on type of measurement task, for which the sensor is to be applied, a wide variety of membrane geometries are used. Quite popular is a spherical- or calotte shape, however, also conical membranes or flat membranes are desired for certain measuring applications.

In the case of manufacture of electrochemical sensors of the field of the present disclosure, usually a module surrounding the ion-selective membrane and a shaft adjoining the membrane is produced. In the case of such glass electrodes, a glass assembly is produced, in that the membrane of an analyte sensitive glass, such as a pH-sensitive glass, is melted or blown on a glass shaft. This glass assembly is then connected with additional modules of the sensor.

Such a glass assembly with analyte sensitive membrane, such as one comprising a spherical- or calotte shape, can be made manually using manual glass blowing techniques, wherein a tubular, most often cylindrical body, in the following referred to as immersion tube, is immersed in a glass melt, which upon subsequent withdrawal from the glass melt, becomes equipped with an approximately determined amount of liquid glass clinging to it. The glassblower then introduces air through the immersion tube by blowing with the mouth, whereby the desired spherical or calotte-shaped cap can be blown from the clinging, molten, viscous glass. This procedure depends on the ability and experience of the glassblower.

The temperature of the glass melt at immersion of the immersion tube plays a role in the forming of the membrane on the immersion tube. A non-uniform temperature distribution in the forming of the membrane leads, for example, to a membrane with differently thick regions, thus, different thicknesses. This, in turn, leads to a reduced lifetime of the membrane and to inexact measurement results when using the membrane.

SUMMARY

It is, consequently, an object of the present disclosure to provide a method, which enables a highly exact production of a membrane for an electrochemical sensor.

The object is achieved by a method as defined in claim 1.

The method of the present disclosure for forming a membrane for an electrochemical sensor comprises steps including a step of providing a first immersion tube having a first opening and a second opening, as well as an apparatus having a melting system, a positioning system, an imaging apparatus, a pressure supplier, a control system. The melting system includes a heating means and a crucible containing a melt. The positioning system is suitable to move the first immersion tube relative to the crucible, such that the first opening of the first immersion tube is immersed in the melt. The imaging apparatus includes a first camera, which is temperature sensitive and is arranged in such a manner that it can see the melt. The pressure supplier is connected air tightly with the first opening of the first immersion tube. The control system is connected with the melting system, the positioning system, the imaging apparatus and the pressure supplier.

The method also includes steps of heating the melt with the heating means to a predetermined first temperature, evaluating the surface of the melt by the first camera, such that at least a first region with a first temperature and a second region with a second temperature are identified, wherein the first temperature is less than the second temperature, and immersing the first opening of the first immersion tube in the first region of the surface of the melt. The method further includes withdrawing the first immersion tube from the melt while supplying a first pressure by means of the pressure supplier, such that a membrane forms over the first opening of the first immersion tube.

The method of the present disclosure assures highly exact production of a membrane for an electrochemical sensor. Due to the evaluating of the surface of the melt, it is possible to detect a region having a homogeneous temperature region for the immersion of the immersion tube. Thus, it is enabled that a membrane with a uniform thickness, thus, a uniform wall thickness, is formed.

In an embodiment of the present disclosure, the imaging apparatus includes a second camera, and there occurs after the step of withdrawing the first immersion tube from the melt a step of ascertaining the thickness of the membrane by the second camera.

In an embodiment of the present disclosure, there occurs after the step of ascertaining the thickness of the membrane a step of providing a second immersion tube, which is identical to the first immersion tube, and there are applied to the second immersion tube the same method steps as for the first immersion tube, wherein when withdrawing the second immersion tube a second pressure is selected by means of the pressure supplier, wherein the second pressure depends on the ascertained thickness of the membrane of the first immersion tube.

In an embodiment of the present disclosure, there occurs after the step of ascertaining the thickness of the membrane a step of providing a second immersion tube, which is identical to the first immersion tube, and there are applied to the second immersion tube the same method steps as for the first immersion tube, wherein the heating of the melt with the heating means is to a predetermined, second temperature, wherein the second temperature depends on the ascertained thickness of the membrane of the first immersion tube.

In an embodiment of the present disclosure, the heating of the melt with the heating means is to at least 850° C.

The apparatus of the present disclosure includes a melting system, a positioning system, an imaging apparatus, a pressure supplier, a control system. The melting system includes a heating means and a crucible containing a melt. The positioning system is suitable for moving the first immersion tube relative to the crucible, such that the first opening of the first immersion tube can come in contact with the melt. The imaging apparatus includes a first camera, which is temperature sensitive and is arranged in such a manner that it can see the melt. The pressure supplier is connected air tightly with the first opening of the first immersion tube. The control system is connected with the melting system, the positioning system, the imaging apparatus and the pressure supplier.

In an embodiment of the present disclosure, the imaging apparatus includes a second camera, which is suitable for ascertaining the thickness of the membrane.

In an embodiment of the present disclosure, the imaging apparatus includes a third camera, which has a third orientation along a third axis, wherein the second camera has a second orientation along a second axis, wherein the second and third axes are arranged transversely to one another.

In an embodiment of the present disclosure, the positioning system includes a planar motor, which is suitable for moving the crucible relative to the immersion tube.

In an embodiment of the present disclosure, the positioning system includes a robot arm, which is suitable for moving the immersion tube relative to the crucible.

BRIEF DESCRIPTION OF THE DRAWINGS

The present disclosure will now be explained in greater detail based on the following description of the figures. The figures of the drawing show as follows.

DETAILED DESCRIPTION

Figure 1:
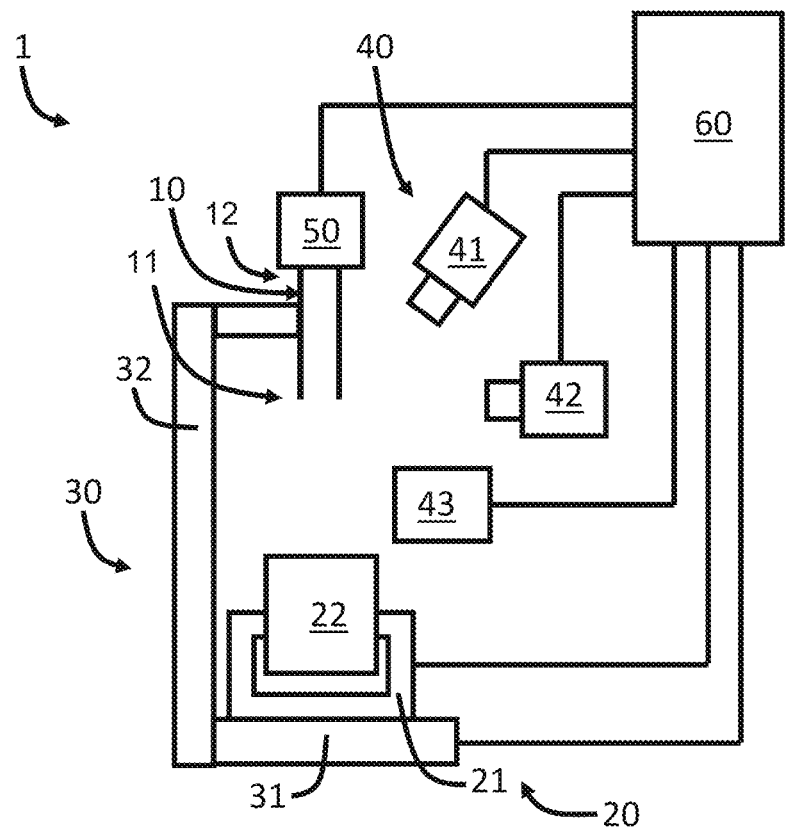
FIG. 1 shows a schematic view of an apparatus of the present disclosure for forming a membrane for an electrochemical sensor.

FIG. 1 shows the apparatus 1 of the present disclosure for forming a membrane on an immersion tube 10 for an electrochemical sensor. The electrochemical sensor is, for example, a pH sensor.

Immersion tube 10 includes a second opening 11 as well as a first opening 12. The first opening 11 is arranged preferably at a first end of the immersion tube 10 and the first opening 12 is preferably arranged at a second end of the immersion tube 10. Immersion tube 10 is preferably a glass tube. In an alternative form of embodiment, which can be combined with all described forms of embodiment, the immersion tube 10 is made of other materials, which have properties similar to those of glass. When the immersion tube 10 is made of a non-transparent material, such form of embodiment is at least compatible with the form of embodiment illustrated in FIG. 3. For example, the immersion tube 10 can be made of ceramic.

Apparatus 1 includes a melting system 20, a positioning system 30, an imaging apparatus 40, a pressure supplier 50 and a control system 60. The control system 60 is connected with the melting system 20, the positioning system 30, the imaging apparatus 40 and the pressure supplier 50.

The melting system 20 includes a heater 21 and a crucible 22 containing a melt 23. Heater 21 is, for example, an inductive heater. Heater 21 can also, for example, be formed by a laser or heating resistances. Heater 21 is so controlled by the control system 60 that the melt 23 in the crucible 22 achieves a predetermined temperature. The crucible 22 is made of platinum, for example, or comprises platinum, rhodium or other noble metals. The melt 23 is molten glass.

Positioning system 30 is suitable to move the first immersion tube 10 relative to the crucible 22, such that the second opening 11 of the first immersion tube 10 comes in contact with the melt 23. Positioning system 30 includes, for example, a planar motor 31, which can move the crucible 22 relative to the immersion tube. Alternatively or complementarily to the planar motor, the positioning system 30 includes a robot arm 32, which can move the immersion tube relative to the crucible 22. Instead of the planar motor, some other apparatus enabling at least a two dimensional, preferably a three-dimensional, movement of the crucible 22 relative to the immersion tube 10 can be used.

Imaging apparatus 40 includes a first camera 41, which is temperature sensitive and which is arranged in such a manner that it can see the melt 23. The first camera 41 is, for example, a heat imaging, or infrared, camera. Imaging apparatus 40 includes a third camera 43, which has a third orientation along a third axis, wherein the second camera 42 has a second orientation along a second axis, wherein the second and third axes are arranged transversely to one another. The second camera 42 and the third camera 43 are, for example, arranged in their directions at 90° relative to one another. This enables that the geometry of the membrane 13 can be checked by the cameras 42, 43 from two sides. Alternatively to the second camera 42 and the third camera 43, it is also possible to use a confocal sensor, such as a chromatic confocal sensor.

Pressure supplier 50 is connected air tightly with the first opening 12 of the first immersion tube 10. This enables that the immersion tube 10 can be suitably supplied with pressure. Pressure supplier 50 can include, for example, a pressure sensor or a pressure transmitter.

The method of the present disclosure for forming a membrane on an immersion tube for an electrochemical sensor will now be described.

In a first step, the first immersion tube 10 as well as the apparatus 1 of the present disclosure are provided. This includes that the apparatus 1 is ready for forming a membrane 13 on the first immersion tube 10. The crucible 22 contains a melt 23. The melt is a glass melt.

In a following step, the melt 23 is heated with the heater 21 to a predetermined first temperature. Preferably, the heating of the melt 23 with the heater 21 achieves a temperature of at least 850° C.

Figure 2:
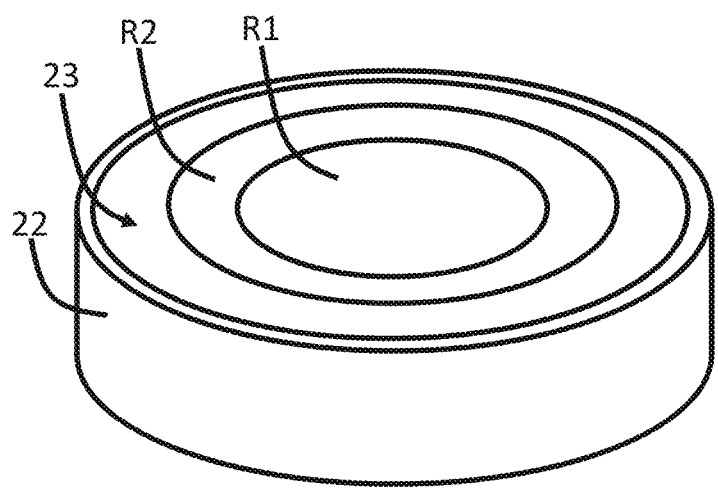
FIG. 2 shows a schematic view of the crucible of FIG. 1.

Then, an evaluating of the surface of the melt 23 with the first camera 41 occurs, such that at least a first region R1 with a first temperature and a second region R2 with a second temperature are identified. The first temperature is less than the second temperature (see FIG. 2). The temperature in the first region R1 is uniform.

Next a step of immersing the second opening 11 of the first immersion tube 10 in the first region R1 of the surface of the melt 23 is performed. The first immersion tube 10 is immersed in the melt 23 in such a manner that the second opening 11 is completely immersed in the melt 23. The first region R1 has a uniform temperature. The temperature regions of the melt 23 are shown schematically in FIG. 2. Then follows a withdrawing of the first immersion tube 10 from the melt 23 while supplying a first pressure by means of the pressure supplier 50, such that a membrane 13 forms over the second opening 11 of the first immersion tube 10.

Figure 3:
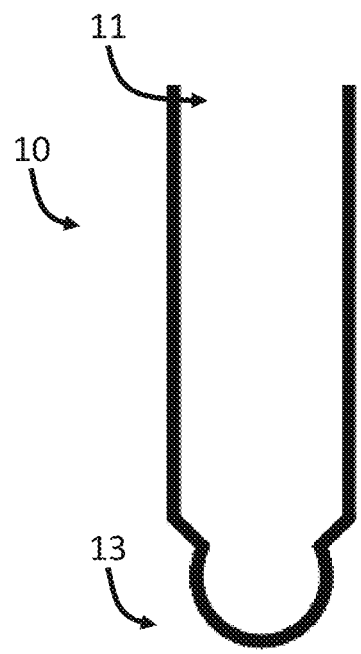
FIG. 3 shows a schematic view of an example of an immersion tube with a membrane produced according to the method of the present disclosure.
Figure 4:
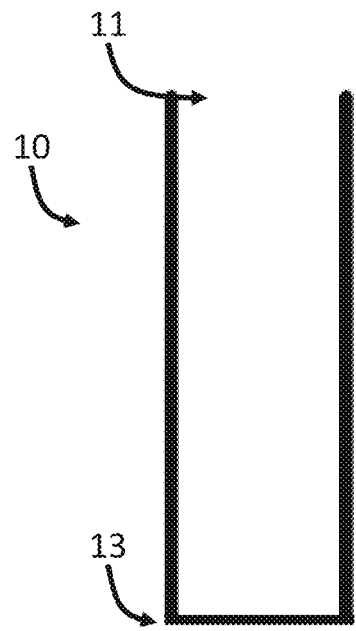
FIG. 4 shows a schematic view of an additional example of an immersion tube with a membrane produced according to the method of the present disclosure.

In an embodiment, preferably after the step of withdrawing the first immersion tube 10 from the melt 23, a step of ascertaining the thickness of the membrane 13, thus, the wall thickness of the membrane 13, by the second camera 42 occurs. In such case, the second camera 42 evaluates the separation between a first, outer surface of the wall of the membrane 13 and a second, inner surface of the wall of the membrane 13, wherein the first surface and the second surface are essentially parallel. The surfaces are the glass-air interfaces. The first surface is the surface, which faces the melt 23, and the second surface is the surface, which faces into the interior of the immersion tube 10. The second camera 42 identifies the first and second surfaces, for example, by evaluating the contour of the membrane 13, as applied in many image processing methods. When a flat membrane is to be formed (see FIG. 4), the immersion tube 10 is made of a transparent material, such that the second surface is not hidden by the immersion tube 10, but, instead, can be seen by the second camera 42. The flat membrane as shown in FIG. 4 is implemented by an essentially planar area, which seals the second opening 11 of the immersion tube 10. If the membrane 13 has an essentially spherical shape, such as shown in FIG. 3, then it is possible in the case of a non-transparent immersion tube 10 for the second camera 42 to ascertain the thickness of the membrane 13, since the membrane 13 is transparent and the membrane 13 in this form of embodiment extends beyond the second opening 11 of the immersion tube 10.

In an embodiment, there follows after the step of ascertaining the thickness of the membrane 13 a step of providing a second immersion tube, which is identical to the first immersion tube 10.

Then the same method steps applied for the first immersion tube 10 are applied for the second immersion tube, with the difference that when withdrawing the second immersion tube a second pressure is selected by means of the pressure supplier 50, wherein the second pressure and or the length of time of the pressure loading depend(s) on the ascertained thickness of the membrane 13 of the first immersion tube 10. If, for example, in the ascertaining of the thickness of the membrane 13 of the first immersion tube 10 it was detected that the thickness was greater than desired, then selected as a second pressure is a pressure higher than the pressure used when forming the membrane 13 of the first immersion tube 10. The higher second pressure, thus, decreases the thickness of the membrane of the second immersion tube. Of course, when it is detected that the membrane 13 of the first immersion tube 10 is too thin, the second pressure is selected lower than the pressure used when forming the membrane 13 of the first immersion tube 10.

Alternatively or complementarily to the above mentioned step of using a pressure dependent on the ascertained thickness of the membrane 13, in the step of heating the melt 23 with the heater 21 to a predetermined, second temperature, the second temperature depends on the ascertained thickness of the membrane 13 of the first immersion tube 10. If, for example, in the case of ascertaining the thickness of the membrane 13 of the first immersion tube 10, it is detected that of the thickness is greater than desired, then selected as a second temperature is a temperature higher than the temperature, which was used in the forming of the membrane 13 of the first immersion tube 10. With a higher second temperature, thus, the thickness of the membrane of the second immersion tube decreases, since the higher temperature leads to a higher viscosity and, thus, to a lower material adhesion of the melt to the second immersion tube. Naturally, when it is correspondingly detected that the membrane 13 of the first immersion tube 10 is too thin, the second temperature is selected lower than the temperature used in the forming of the membrane 13 of the first immersion tube 10.

In an embodiment, after the step of evaluating the surface of the melt, the temperature of the first region R1, which is used for the immersion of the immersion tube, is reconciled with a desired temperature. In case the desired temperature is not achieved, a step of cooling the melt, or, as the case may be, of heating the melt, is performed. The cooling is accomplished, for example, by a cooling session, in which there is no heating or the heating is with reduced power. This form of embodiment enables a heating of the melt 23 as a function of the temperature image of the melt 23.

By taking into consideration measurement data, here the membrane thickness, from preceding membrane productions, thus, for example, of the first immersion tube 10, it is possible to improve subsequent membrane productions, thus, for example, the second immersion tube.

After the step of withdrawing the immersion tube from the melt 23, a spherical membrane (see FIG. 3) or a flat membrane (see FIG. 4) forms, depending on the pressure loading. The method of the present disclosure is suited also for forming membranes, which have a calotte shape or a cone shape.

The method of the present disclosure enables optimizing blowing as regards glass melt temperature and therewith the achieving of a uniform thickness distribution in the membrane. Furthermore, in the case of flat membranes, a significantly better and reliable service life as well as a constant sensor performance are achieved. Moreover, an optimizing is achieved by the assuring of the optimum blowing temperature, and also with reference to the durability of the membrane by preventing membrane cracks.

The invention claimed is:

1. A method for forming a membrane on an immersion tube for an electrochemical sensor, comprising steps as follows:
   providing a first immersion tube having a first opening and a second opening, as well as an apparatus having a melting system, a positioning system, an imaging apparatus, a pressure supplier, and a control system, wherein the melting system includes a heater and a crucible containing a melt, wherein the positioning system is suitable to move the first immersion tube relative to the crucible, such that the first opening of the first immersion tube is immersed in the melt, wherein the imaging apparatus includes a first camera, which is temperature sensitive and is arranged in such a manner that it can see the melt, wherein the pressure supplier is connected air tightly with the first opening of the first immersion tube, wherein the control system is connected with the melting system, the positioning system, the imaging apparatus and the pressure supplier, heating the melt with the heater to a predetermined first temperature, evaluating a surface of the melt by the first camera, such that at least a first region with a first measured temperature and a second region with a second measured temperature are identified, wherein the first measured temperature is less than the second measured temperature, immersing the second opening of the first immersion tube in the first region of the surface of the melt, withdrawing the first immersion tube from the melt while supplying a first pressure by means of the pressure supplier, such that a membrane forms over the second opening of the first immersion tube.

2. The method as claimed in claim 1, wherein the imaging apparatus includes a second camera, and there occurs after the step of withdrawing the first immersion tube from the melt a step of ascertaining a thickness of the membrane by the second camera.

3. The method as claimed in claim 2, wherein there occurs after the step of ascertaining the thickness of the membrane a step of providing a second immersion tube, which is identical to the first immersion tube, and there are applied to the second immersion tube the same method steps as for the first immersion tube, wherein when withdrawing the second immersion tube a second pressure is selected by means of the pressure supplier, wherein the second pressure depends on the ascertained thickness of the membrane of the first immersion tube.

4. The method as claimed in claim 2, wherein there occurs after the step of ascertaining the thickness of the membrane a step of providing a second immersion tube, which is identical to the first immersion tube, and there are applied to the second immersion tube the same method steps as for the first immersion tube, wherein the heating of the melt with the heater is to a predetermined second temperature, wherein the predetermined second temperature depends on the ascertained thickness of the membrane of the first immersion tube.

5. The method as claimed in claim 1, wherein the heating of the melt with the heater is to at least 850° C.

* * * * *